Jan. 2, 1968  I. D. PETERSON  3,361,299
FOOD DISPENSER
Filed June 24, 1965  3 Sheets-Sheet 1
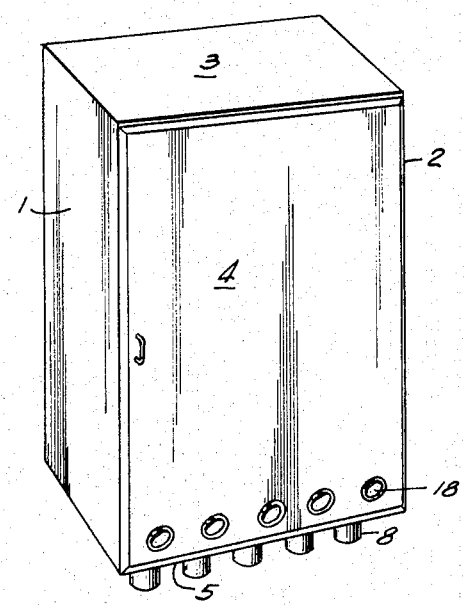
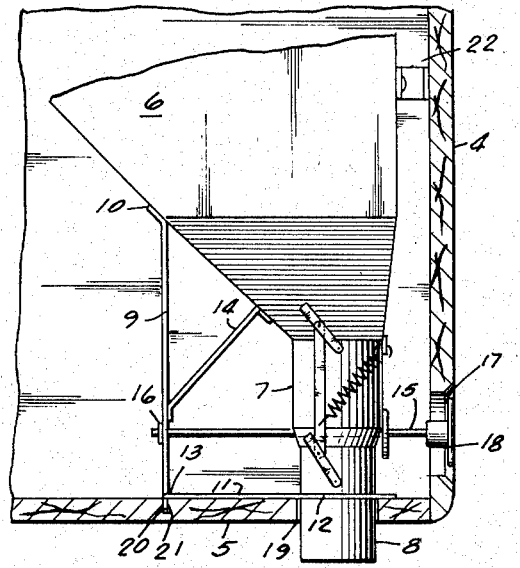
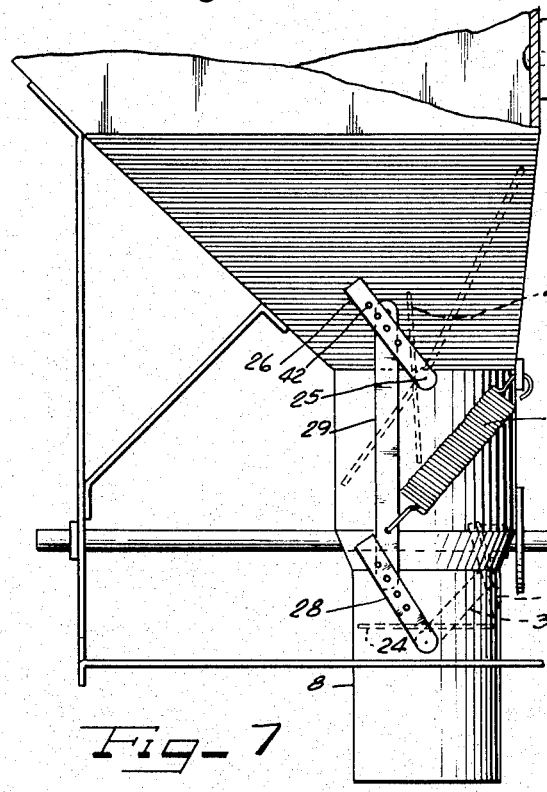
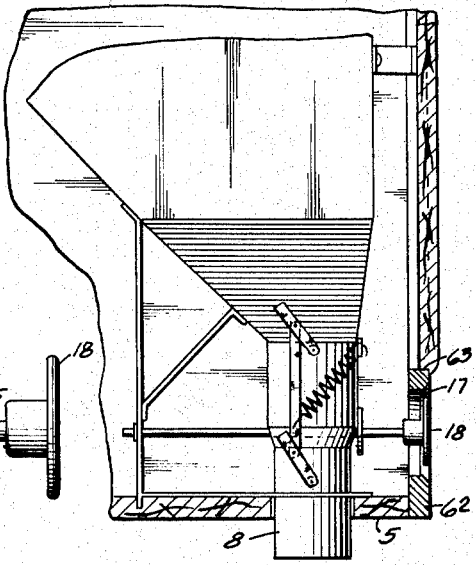
INVENTOR
IVAR D. PETERSON
BY *Hill, Sherman, Meroni, Gross & Simpson* ATTORNEYS

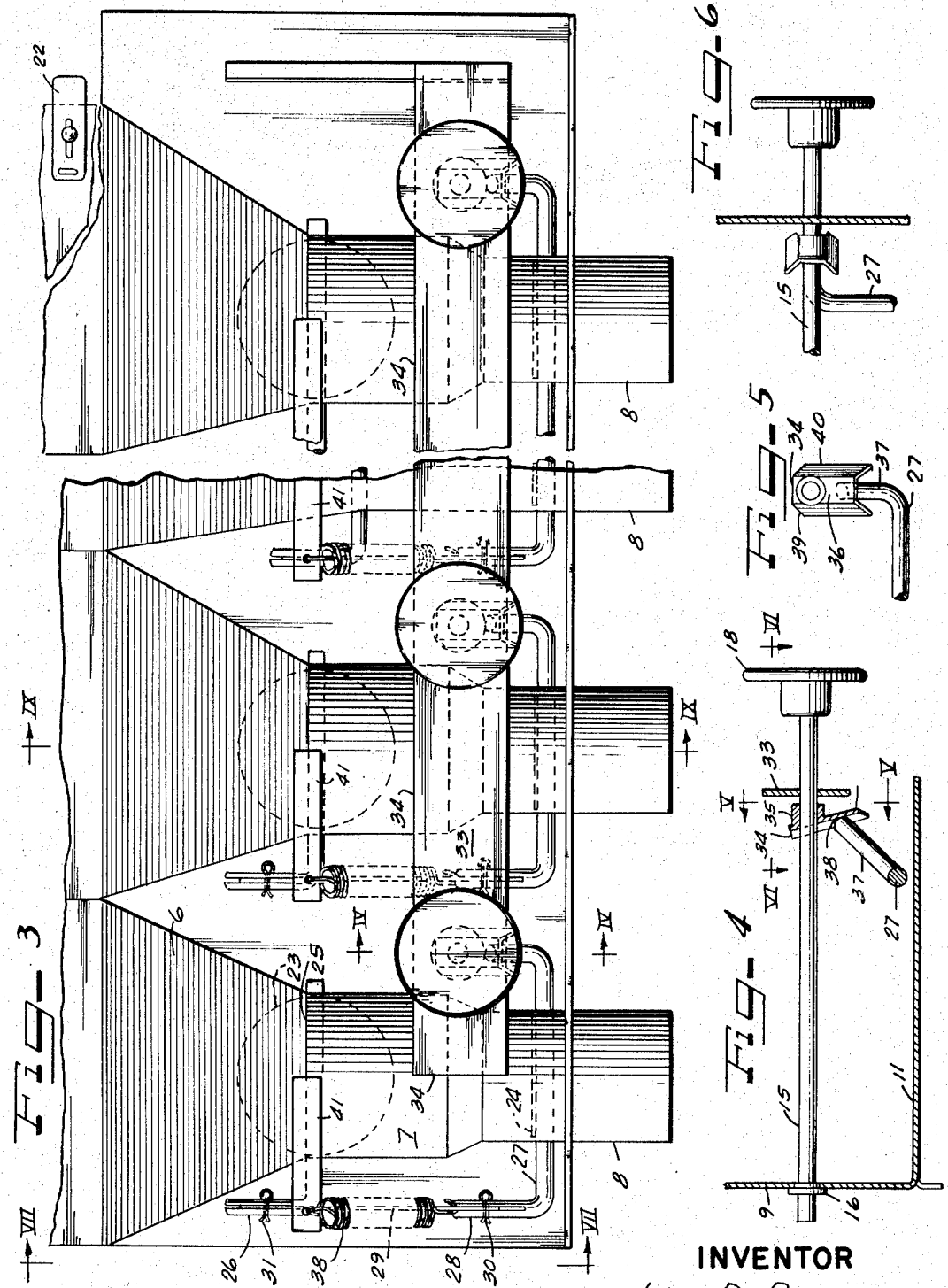

Jan. 2, 1968     I. D. PETERSON     3,361,299
FOOD DISPENSER
Filed June 24, 1965     3 Sheets-Sheet 3
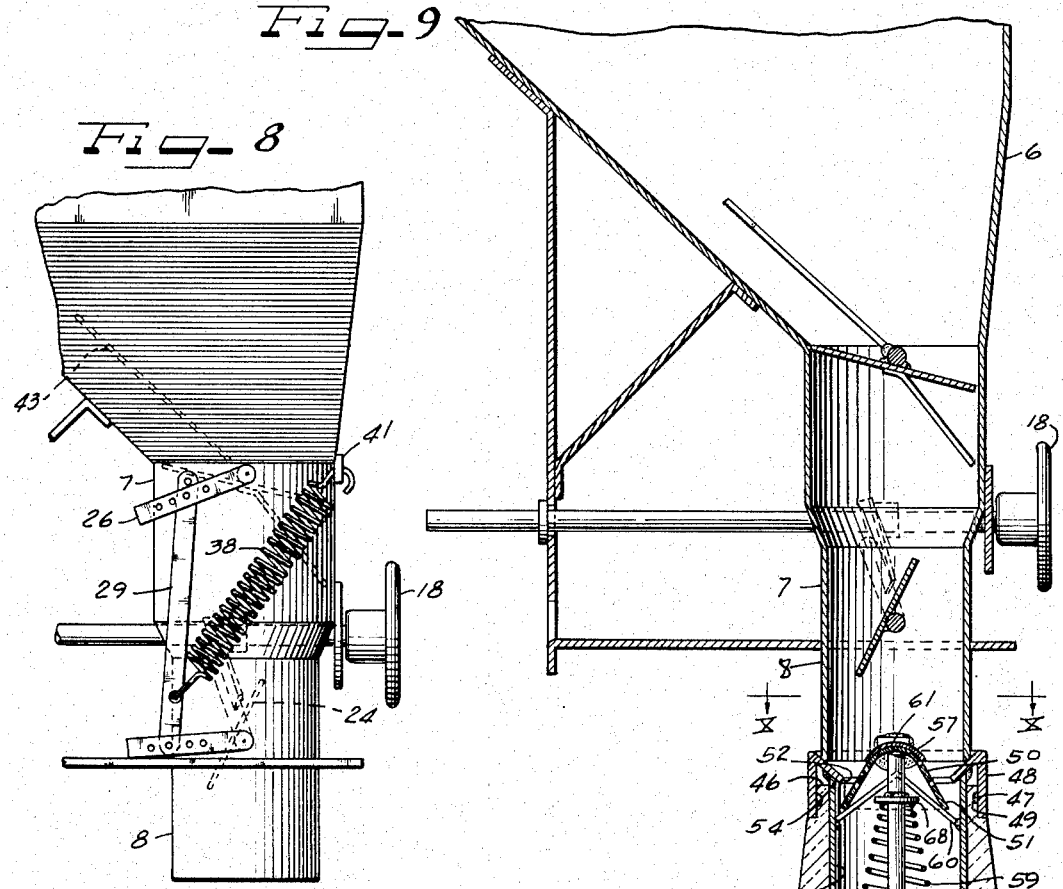
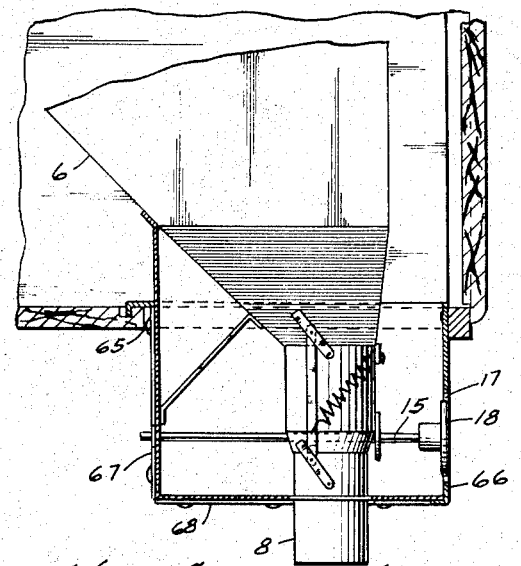
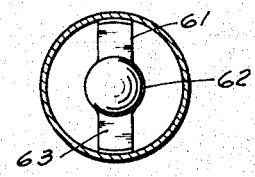
INVENTOR
IVAR D. PETERSON
BY *Hill, Sherman, Meroni, Gross & Simpson* ATTORNEYS

United States Patent Office 3,361,299
Patented Jan. 2, 1968

3,361,299
FOOD DISPENSER
Ivar D. Peterson, 321 Norway St.,
Norway, Mich. 49870
Filed June 24, 1965, Ser. No. 466,550
1 Claim. (Cl. 222—129)

This invention relates to a food dispenser and in particular to a gravity operated food dispenser having a plurality of dispensing units assembled for being usefully employed within a novel household cabinet.

The increasing number of separate household containers and particularly kitchen containers has created storage problems resulting generally in the stored goods being inaccessible to the user. This inaccessibility, has in turn especially conflicted with modern trends toward speedier and more efficient living.

Only recently, studies have indicated that much household effort is wasted in the duplication of unnecessary and unproductive movements. The result of these studies has begun to be evident in the form of novel appliances and in new arrangements for appliances having operational relationships to one another. However, while larger household equipment has been redesigned and re-orientated to save movements, smaller items have been contrastingly neglected. Furthermore, this neglect has been especially unfortunate as the excessive handling of smaller consumption goods such as fluor, suger, coffee and the like has been shown to be a significant obstacle in attempts at increasing household efficiency. Therefore, it is an object of this invention to provide a food dispenser for eliminating the excessive handling of bulk consumption goods.

It is also an object of this invention to provide a food dispenser having a plurality of bulk dispensing units cooperatively assembled to be efficiently employed within a household cabinet.

It is another object of this invention to provide a food dispenser having a plurality of dispensing units enclosed within a novel household cabinet for being actuated externally thereof.

It is a further object of this invention to provide a food dispenser in conjunction with a household cabinet for automatically filling a secondary dispensing unit.

It is an additional object of this invention to provide a food dispenser in conjunction with a novel household cabinet for dispensing a uniform flow of bulk goods therefrom.

These and other objects, features and advantages of the present invention will be understood in greater detail from the following description and the associated drawings wherein reference numerals are utilized in designating a preferred embodiment and wherein:

FIGURE 1 shows a food dispenser according to this invention as disposed within a novel household cabinet;

FIGURE 2 is a sectional view of the assembly illustrated in FIGURE 1 showing the details of positioning for the dispensing unit within the associated cabinet;

FIGURE 3 is a front view of the dispensing unit of this invention as seen within a cabinet according to this invention;

FIGURE 4 is a side view of an actuator assembly used in the operation of the dispensing unit of this invention and is taken along the lines IV—IV of FIGURE 3;

FIGURE 5 shows a portion of the assembly of FIGURE 4 as taken along the lines V—V;

FIGURE 6 is a further view of the assembly of FIGURE 4 as taken along the lines VI—VI thereof;

FIGURE 7 is a side view of one of the dispensing units according to this invention and is taken along the lines VII—VII of FIGURE 3 for showing the operational features thereof;

FIGURE 8 is a partial view of the unit shown in FIGURE 7 for illustrating a different operational setting;

FIGURE 9 is a partial side view of the dispenser of this invention showing parts thereof for illustrating automatic filling of a secondary dispensing unit;

FIGURE 10 shows a nozzle stop utilized in the automatic filling of a secondary dispensing unit and is taken along the lines X—X of FIGURE 9;

FIGURE 11 is an alternate embodiment for the dispensing unit and associated cabinet as specified in this invention; and FIGURE 12 shows a further modification of the alternate structure as illustrated in FIGURE 11.

This invention contemplates a series of individual food dispensing units which are combined to form a useful assembly for being effectively deployed within a household cabinet and in particular within a wall cabinet having complementary features.

A preferred embodiment of this invention is shown in FIGURE 1 and comprises generally a kitchen wall cabinet having sides 1 and 2, a top 3 and a swing type door 4 hinged at the side wall 2. The food dispensing assembly is mounted at the cabinet base or floor 5 as shown in the sectioned view of FIGURE 2.

In FIGURE 2 it can be observed that the dispensing units comprise a food hopper 6 for maintaining a reserve supply of the item to be dispensed, a measurement chamber 7 where the quantity of food to be dispensed at a single demand is determined, and an outlet nozzle 8 for guiding the dispensed food to a suitable receptacle. These three sections are formed integrally and are supported by a frame having a vertical member 9 secured as by welding to the rear face of the food hopper 6 at the point 10 and a horizontal member 11 secured by a similar process to the outlet nozzle at the point 12. The vertical and horizontal members are then joined at a point 13 to form a rigid support bracket. Also, a rib 14 is provided intermediate the vertical member 9 and the hopper 6 for offering additional support to the assembly.

Generally, the actuation of the dispensing mechanism is accomplished through longitudinal movements of actuator rods 15 within collars 16 mounted rearward of the dispensing unit.

It should be noted that the favorable features of both of the dispensing units and the cabinet of this invention combine for producing a useful household device. In this connection it can be seen that the dispensing units are maintained within the cabinet at all times with the result that the contents of the food hopper 6 are continuously protected by the closed environment. This is made possible by the provision for a series of actuation openings 17 formed within the lower section of the cabinet door 4 for receiving the rods 15. The rods 15 are then provided with push buttons 18 which can be operated directly through the associated openings 17. Also the base 5 is provided with dispensing ports 19 for receiving the outlet nozzles 8 of the individual dispensing units.

Because actuation is accomplished by a pushing action means must be provided to prevent the assembly from sliding rearward on the floor 5. To eliminate this sliding action and to maintain the dispensing assembly in proximity with the cabinet door 4 for being operated through the ports 17, the support bracket consisting in part of the vertical member 9 is provided with a depending lip 20 which is received within a similarly formed groove at the floor 5.

However, the provision for the depending lip 20 does not eliminate all motion problems. With the point 20 firmly locked within the cabinet floor 5, depressing the actuator rod 15 will develop a torque about the point 13. To resist this torque the upper portion of the food hopper 6 is provided with a clip 22 for securing the entire device forward and upward of the actuation axis. The combined effect of the lip 20 and the clip 22 is to provide substantial stability during actuation of the system.

In FIGURE 3 the individual units are shown joined for forming the dispensing assembly as deployed within the cabinet of FIGURE 1. Here the measurement chamber 7 is shown to be separated from the food hopper 6 and the outlet nozzle 8 by upper and lower butterfly valves having valve disks 23 and 24, respectively. The upper disk 23 is pivoted diametrically about a horizontally disposed rotary arm 25 having a right angled translation leg 26. Here the disk 23 is shown in a fully opened position for allowing direct communication between the food hopper 6 and the measurement chamber 7. When, however, the translation leg 25 is driven counterclockwise, the disk 23 will be rotated from a vertical to a horizontal plane for sealing the food hopper 6 from the chamber 7.

Like the upper disk 23, the lower disk 24 is pivoted diametrically about a horizontally disposed rotary arm 27 also having a right angled translation leg 28. Unlike the upper disk 23 the disk 24 is maintained in a closed position with respect to the measurement chamber 7. When, however, the translation leg 28 is driven counterclockwise, the valve disk 24 will be pivoted from a horizontal to a vertical plane for providing direct communication between the measurement chamber 7 and the outlet nozzle 8.

From a consideration of the above-described valves, it is apparent that were the same rotary motion to be applied to the arms 25 and 27 simultaneously, the position of the valve disks 23 and 24 would be just reversed from that shown in FIGURE 3. As will be understood, this is the precise action which is required of this food dispenser, and for this purpose an interconnecting link 29 is provided between the translation legs 26 and 28. In this embodiment, the necessary connection is made by the use of cotter pins 30 and 31. Consequently the rotary arm 25 will be constrained to follow a forced rotation of the arm 27.

The driving force needed to rotate the arm 27 is accomplished through the actuator rod 15 as shown in FIGURE 2. The precise mechanics of transmuting the translation of the horizontally deployed rod 15 into the rotary motion required by the arm 27 can best be understood by reference to FIGURES 4, 5 and 6.

FIGURE 4 is taken along the lines IV—IV of FIGURE 3 and shows the actuator rod 15 as received within the collar 16 at the rear support 9. Forward of the dispenser assembly the rod 15 is supported at a panel 33 within an opening formed axially of the collar 16. Reference to FIGURE 3 indicates that the panel 33 is secured to each dispensing unit at points 34 on the measurement chambers 7. Therefore, the panel 33 is a primary support not only for the rod 15 but also for the dispenser as a whole.

By virtue of its slidable mounting, the actuator rod 15 is allowed to translate axially in response to force applied to the push buttons 18. This translation is transmuted to the necessary rotary movement through the provision for a guide fixture 34. The fixture 34 has a collar 35 for fixedly receiving the actuator rod 15 and a depending flange 36 for receiving a translation stem 37 of the rotary arm 27. The stem 37 is held in continuous engagement with the flange 36 by a spring 38 shown in FIGURE 3 as being connected between the linkage 29 and a panel 41 secured to the hopper 6.

It is apparent, therefore, that since the arm 27 is constrained by its pivotal mounting into a rotary movement, the rearward translation of the actuator rod 15 and hence of the guide fixture 34 will rotate the stem 37 in a counterclockwise direction. This rotation of the stem 37 is accommodated by allowing its upper end 38 to slide upwardly at the rear of the flange 36.

The guide fixture 34 is shown isolated in FIGURE 5 which is taken along the lines V—V of FIGURE 4. Here it can be observed that the flange 36 is provided with rearwardly extending walls 39 and 40 which serve to guide the movement of the rotation stem 37 and to assure that the two members do not become disengaged.

A further view of the fixture 34 and its associated members is shown in FIGURE 6 which is taken along the lines VI—VI of FIGURE 3 for emphasizing the cooperable relationship of the rod 15 and the arm 27.

The operation of the dispensing units of this invention may be further understood by reference to FIGURES 7 and 8 jointly which show side views of the above-mentioned linkages. In particular, FIGURE 7 shows the upper and lower valve disks 23 and 24 in opened and closed positions respectively, while FIGURE 8 shows the opposite orientation.

It can be seen in FIGURES 7 and 8 that the rearward movement of the arm 15 will generate, through the cooperation of the guide fixture 34 and the rotation stem 37, a counterclockwise motion at the translation leg 28. Consequently, due to the interconnecting rod 29, the upper leg 26 will be likewise constrained into a counterclockwise rotation. The result is a reversal of the respective valve settings.

It is to be noted here that once the actuator rod 15 has been depressed for opening the lower valve disk 24 as in FIGURE 8, means must be provided for re-establishing the original setting. In this embodiment, such a means is shown in the form of the coil spring 38 which, as mentioned, is connected from the plate 41 to the interconnecting linkage 29. When the pressure applied to the button 18 is released, the spring 38 will cause the linkage 29 to move upwardly for rotating the lower and upper disks 24 and 23 and resetting the rod 15.

Referring again to FIGURES 7 and 8, it will be appreciated that the provision for the opposite orientation of the valve disks 23 and 24 permits the dispensing of a set quantity of food. This measurement is determined by two factors, first, the quantity of food that is contained in the measurement chamber when the lower disk 24 is closed and second, the rate of flow that is permitted between the food hopper 6 and the measurement chamber 7 when the lower disk 24 is being opened.

It is apparent that the first of these factors is a fixed quantity. The second factor, however, may be varied by changing the relative angles of the upper and lower disks 23 and 24. Here, this is accomplished by the use of variable length linkages. As shown in FIGURES 7 and 8, the translation legs 28 and 26 are provided with a series of bores 42. Therefore, the setting may be changed simply by altering the position of the readily removable cotter pins 30 and 31.

Also in FIGURES 7 and 8, means are provided to assure a uniform flow of the bulk goods from the food hopper 6 and the measurement chamber 7 to the outlet nozzle 8. This means takes the form of a bifurcated agitator 43 extending upwardly and downwardly of the rotary arm 25. The agitator 43 is in fact fixedly mounted to the arm 25 and, therefore, will be repeatedly drawn through the goods which may otherwise coagulate.

With the operation of the dispensing mechanism outlined in FIGURES 1–8, FIGURE 9 has been simplified for illustrating an additional feature associated with this invention.

In FIGURE 9 the outlet 7 of the food dispenser is shown in engagement with a secondary dispensing unit such as a salt shaker or the like. Generally, the secondary dispensing unit comprises side walls 44 defining both a storage cavity 45 and an opening 46. A novel dispensing head is shown mounted within the opening 46 and is secured to the walls 44 through complementary surfaces provided by a rim 47 formed inwardly of a supporting collar 48 and a groove 49 disposed at the outer surface of the walls 44.

The dispensing head has a perforated cap 50 which is spring biased such that its lower edge 51 is cooperable with the inner face 52 of the collar 48 for preventing the flow of food therebetween. This spring bias is made possible through the provision for a bracket 53 depending from the lower surface 54 of the collar 48. The bracket 53 has an opening 55 formed centrally thereof for slidably receiving a guide rod 56 which is secured as by welding to the inner surface of the perforated cap 50 at a point 57. The rod 56 has an outwardly extending flange 58 fixedly secured thereto for receiving the upper end of a biasing spring 59 which is seated at the base of the bracket 53.

It can be seen, therefore, that the bias applied by the spring 59 not only maintains the perforated cap 50 in engagement with the collar 52 for closing the opening 46 but also allows the storage cavity 45 to be re-filled by providing a passageway between the faces 51 and 52 when the head 50 is depressed inwardly of the collar 48. It should be noted that the bracket 53 is provided with a slide stop 60 fixedly mounted at the inner surface thereof for preventing excessive downward movements of the cap 50 which would tend to strain the spring 59 resulting in a failure to effect a tight closure of the opening 46.

To automatically depress the perforated cap 50 for filling the storage cavity 45, the principal food dispenser is provided with a pressure stop 61 which is shown isolated in FIGURE 10. It can be seen that the stop 61 comprises a concave surface 62 which is held centrally of the outlet nozzles 7 by supporting webs 63.

It is understood, therefore, that the secondary dispenser may be automatically filled simply by placing the collar 48 in engagement with the lower edge of the nozzle 7. In this way the cap stop 61 will engage the complementary surface of the perforated cap 50 for compressing the spring 59 and providing a passageway between the cap and collar surfaces 51 and 52. As this motion may be accomplished with one hand, the other hand is free to actuate the push button 18 for releasing a fixed measurement of food from the food hopper 6.

Finally, FIGURES 11 and 12 illustrate alternate embodiments of the food dispenser assembly of this invention.

In FIGURE 11 it can be observed that the actuation openings 17 are formed within a lower panel 62 disposed at the base 5 of the associated cabinet. Therefore, unlike the example of FIGURE 2, the door 4 remains intact and is caused to abut the upper edge of the panel 62 as at 63.

In FIGURE 5, rather than alter the cabinet face as in FIGURES 2 and 11, the base 5 is provided with a principal dispenser opening 65 for receiving the entire lower dispenser body such that only the hopper 6 remains within the cabinet itself. To accomplish this, the measurement chamber is provided with an enclosure comprising front, rear and base walls 66, 67 and 68. Like the panel 62 in FIGURE 11, the front wall 66 is provided with a series of actuation openings 17 for receiving the rods 15 and the associated push buttons 18.

It will be understood that various modifications may be suggested by the embodiment disclosed, but I desire to claim within the scope of the patent warranted hereon all such modifications as come within the scope of my invention.

I claim as my invention:

1. A gravity operated food dispenser comprising a plurality of food hoppers each having:
    (a) a funnel section thereof,
    (b) a measurements chamber conducting from said funnel section,
    (c) a spout leading from said measurements chamber,
    (d) a first butterfly valve operably disposed intermediate said funnel base and said measurements chamber and a second butterfly valve operably disposed intermediate said measurements chamber and said spout,
    (e) an actuator rod and associated linkages connected to said butterfly valves for opening and closing said first butterfly valve and substantially simultaneously closing and opening respectively said second butterfly valve,
        a dispenser housing for supporting and maintaining said food hoppers in a fixed and cooperable relationship,
        a household cabinet including a cabinet floor, oppositely disposed side walls, a top and a cabinet door operably mounted thereof,
        a longitudinal groove formed within the cabinet floor,
        a longitudinal lip depending from the rear of the funnel section and detachably received within said groove,
        said cabinet floor having a plurality of dispenser openings therein for receiving said spouts therethrough.

References Cited

UNITED STATES PATENTS

| | | | |
|---|---|---|---|
| RE. 25,879 | 10/1965 | Rhodes et al. | 222—514 X |
| 1,730,784 | 10/1929 | Rogginger | 222—228 X |
| 1,885,201 | 11/1932 | Holley | 222—185 X |
| 2,718,335 | 9/1955 | Shippen | 222—135 |
| 2,718,985 | 9/1955 | Tamminga | 222—185 X |
| 3,061,152 | 10/1962 | Safianoff et al. | 222—514 |
| 3,119,529 | 1/1964 | Maestrelli | 222—450 X |
| 3,185,348 | 5/1965 | Pollak et al. | 222—185 X |

FOREIGN PATENTS 610,250   10/1960   Italy.

ROBERT B. REEVES, *Primary Examiner.*

N. L. STACK, *Assistant Examiner.*